Sept. 16, 1958        A. O. HEIT        2,852,114
HANDLES FOR HANDBAGS AND LUGGAGE
Filed July 18, 1957
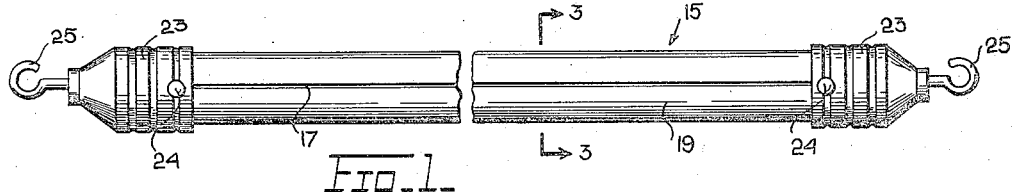
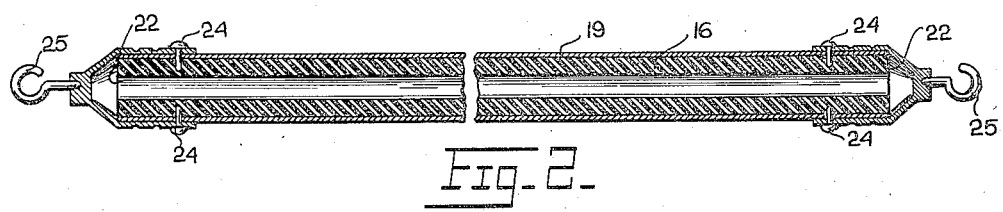
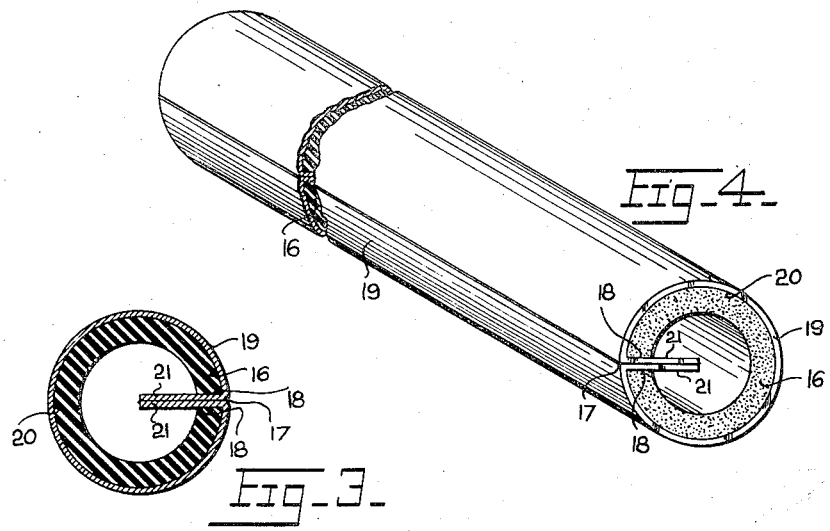
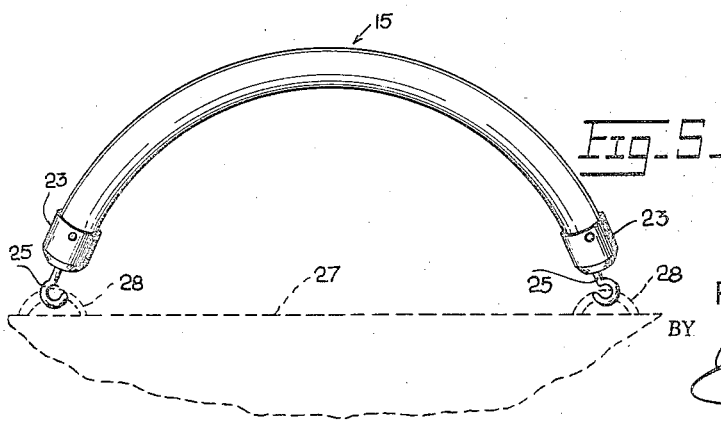
INVENTOR.
ARTHUR O. HEIT
BY
ATTORNEY

United States Patent Office 2,852,114
Patented Sept. 16, 1958

2,852,114
HANDLES FOR HANDBAGS AND LUGGAGE

Arthur O. Heit, Jamaica Estates, N. Y.

Application July 18, 1957, Serial No. 672,607

1 Claim. (Cl. 190—57)

This invention relates to handles for handbags, brief cases and all sorts of luggage, and to a method for fabrication thereof.

Heretofore handles with laminated constructions having a body member covered by flexible materials such as leather or various types of fabrics, were produced by manual folding, bending, shaping and stitching operations which were not only time consuming and expensive but also subject to many inherent defects resulting in the rejection of a large number of the completed handles.

It is, therefore, an important object of the present invention to provide a handle of new and improved construction and pleasing appearance which is held together without any stitching.

Another object is realized in the provision of a novel covering for the handle overlapped and tightly wrapped against and about the shell which constitutes the body of the handle and which requires no stitching.

A further object is to provide such a handle which is produced by covering a shell or body member with a plastic covering material in which the method utilizes a minimum of operational steps with a consequent decrease in production costs.

Still another object is to provide a handle of this kind which automatically assumes a desired shape upon attachment to the bag or other carrier.

It is also an important object to provide a handle of this kind which is simple and sturdy in construction, light in weight, soft and smooth to the touch and comfortable when held in the hand and is characterized by fewness of parts.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a side elevational view of a handle embodying my invention.

Fig. 2 is a longitudinal sectional view taken through the center of the handle.

Fig. 3 is an enlarged cross-sectional view taken on the plane of the line 3—3 of Fig. 1.

Fig. 4 is an enlarged perspective view of a fragment of the handle, parts being shown broken away.

Fig. 5 is a side elevational view of the handle applied to a handbag and showing the shape assumed by the handle upon such application.

Referring to the drawings in detail, a handle made in accordance with the invention is shown in Fig. 1 and is indicated generally at 15. This handle comprises an elongated tubular shell 16, round in cross section, slitted from end to end as indicated at 17, leaving long opposed edges 18, 18, with squared off corners. The tubular shell is formed of rubber which is sufficiently rigid to hold its tubular shape with its long edges in face-to-face relationship.

A cover 19 is tightly wrapped around the outer surface of the shell and is secured thereon by adhesive or cement as indicated at 20. The cover is formed of thin, flexible material preferably similar to the material of the handbag or other carrier to which the handle is to be applied, such material preferably being plastic, leather, leatheroid or other suitable fabric cover material. The dimension of the cover is larger than that of the tubular shell, leaving an excess of cover material along the edges thereof as indicated at 21, which passes loosely over the faces of the long edges 18, 18 of the shell and which protrudes into the interior of the shell, this excess of material tightly fits in the slot in the shell and serves to seal the crack or slit in the tubular shell. The tubular shell 16 and cover 19 constitute the handle assembly.

Directly attached to the shell and cover and covering the ends 22 of the handle assembly are caps 23. The caps 23 are cup-shaped pieces of metal and frictionally fit over the ends of the handle assembly. The caps are firmly attached to the handle by means of pins 24 extending through opposed openings in the caps at their open ends and through the cover and shell 16. A hook 25 is secured in any suitable manner to the closed end of each cap and extends outwardly therefrom, the hooks serving to pivotally apply the handle to a handbag or the like 27 shown in dot-dash lines in Fig. 5. The overall length of the handle 15 is usually longer than the space between the rings or loops 28 mounted on the ordinary handbag, such as the handbag 27, so that when the handle is hooked onto said rings or loops, it assumes a slightly bent or curved shape as shown in Fig. 5. The construction and the flexibility of the material of the handle permit this action.

In assembly, the cover 19 is cemented over the shell 16 and the edges of the cover tucked through the slit 17 and into the interior of the shell. The caps 23 are then applied to the ends of the superimposed cover and permanently secured by the pins 24.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A handle comprising an elongated tubular shell of semirigid rubber slitted from end to end, a rectangular-shaped cover of thin flexible plastic material cemented on the outer surface of said shell, the dimension of said cover being larger than the dimension of said shell, the long edges of said cover provided by said excess dimension being tucked in between the slit in the shell and into the interior of the shell, said long edges tightly fitting in said slit, caps secured to and covering the ends of the covered tubular shell and hooks rigidly mounted on the caps for pivotally attaching the handle to a handbag and the like whereby the handle assumes a curved shape.

References Cited in the file of this patent

UNITED STATES PATENTS

| | | |
|---|---|---|
| 649,832 | Furnivall | May 15, 1900 |
| 748,012 | Ritter et al. | Dec. 29, 1903 |
| 1,705,858 | Finkelstein | Mar. 19, 1929 |

FOREIGN PATENTS

| | | |
|---|---|---|
| 273,453 | Great Britain | July 7, 1927 |